(12) United States Patent
Elstorpff et al.

(10) Patent No.: US 8,826,801 B2
(45) Date of Patent: Sep. 9, 2014

(54) PNEUMATIC BRAKE CYLINDER

(75) Inventors: Marc-Gregory Elstorpff, München (DE); Christian Ebner, Augsburg (DE); Michael Mathieu, Puchheim (DE); Erich Fuderer, Fürstenfeldbruck (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 697 days.

(21) Appl. No.: 13/124,137

(22) PCT Filed: Oct. 7, 2009

(86) PCT No.: PCT/EP2009/007184
§ 371 (c)(1),
(2), (4) Date: May 10, 2011

(87) PCT Pub. No.: WO2010/043324
PCT Pub. Date: Apr. 22, 2010

(65) Prior Publication Data
US 2011/0226568 A1    Sep. 22, 2011

(30) Foreign Application Priority Data

Oct. 15, 2008 (DE) .................. 10 2008 051 680

(51) Int. Cl.
| | |
|---|---|
| *F16J 9/00* | (2006.01) |
| *F16J 15/16* | (2006.01) |
| *B60T 17/08* | (2006.01) |
| *F16D 65/56* | (2006.01) |
| *F16D 121/02* | (2012.01) |
| *F16D 125/06* | (2012.01) |

(52) U.S. Cl.
CPC ............ *B60T 17/08* (2013.01); *F16D 2121/02* (2013.01); *F16D 65/56* (2013.01); *F16D 2125/06* (2013.01)
USPC .............................. 92/245; 92/63; 92/165 PR

(58) Field of Classification Search
USPC ............................... 92/63, 165 PR, 240, 245
See application file for complete search history.

(56) References Cited

U.S. PATENT DOCUMENTS

| | | | |
|---|---|---|---|
| 4,364,305 | A | 12/1982 | Dalibout et al. |
| 4,541,640 | A | 9/1985 | Tregonning |

(Continued)

FOREIGN PATENT DOCUMENTS

| | | |
|---|---|---|
| CN | 2114067 U | 8/1992 |
| DE | 1 000 245 | 1/1955 |

(Continued)

OTHER PUBLICATIONS

International Search Report for International Application No. PCT/EP2009/007184, dated Mar. 3, 2010.

(Continued)

*Primary Examiner* — Michael Leslie
(74) *Attorney, Agent, or Firm* — Barnes & Thornburg LLP

(57) ABSTRACT

The invention relates to a pneumatic brake cylinder including a piston for transferring the pneumatic pressure to a brake, a pressure chamber defined by the piston and part of the inner wall of the brake cylinder, and a sealing ring sealing a gap between the piston and the inner wall of the brake cylinder. According to the invention, the sealing ring is vulcanised onto the piston.

5 Claims, 2 Drawing Sheets

(56) References Cited

U.S. PATENT DOCUMENTS

| | | | |
|---|---|---|---|
| 5,014,599 A * | 5/1991 | Kocsis et al. | 92/245 |
| 6,651,784 B1 | 11/2003 | Barbosa et al. | |
| 2004/0168867 A1 | 9/2004 | Kerscher et al. | |
| 2007/0129497 A1 | 6/2007 | Jiang et al. | |

FOREIGN PATENT DOCUMENTS

| | | |
|---|---|---|
| DE | 42 40 495 | 6/1994 |
| DE | 102 44 916 | 4/2004 |
| DE | 10 2005 001 234 | 7/2005 |
| EP | 0 451 638 | 10/1991 |
| GB | 2 339 868 | 2/2000 |

OTHER PUBLICATIONS

German Office Action of Application No. 10 2008 051 680.5, Dec. 13, 2012.

Chinese Office Action of Application No. 200980140853.2, Dec. 4, 2012.

* cited by examiner

PNEUMATIC BRAKE CYLINDER

CROSS-REFERENCE TO RELATED APPLICATIONS

The present application claims the benefit of priority to International Patent Application No. PCT/EP2009/007184 filed 7 Oct. 2009, which further claims the benefit of German Patent Application No. 10 2008 051 680.5 filed 15 Oct. 2008, the contents of which are incorporated herein by reference in their entirety.

FIELD OF THE INVENTION

Disclosed embodiments relate to a pneumatic brake cylinder.

BACKGROUND

Brake cylinders of this type are used, inter alia, in rail vehicles. There, they are frequently used to actuate a brake caliper, with the aid of which brake linings are pressed onto a brake disk.

In pneumatic brake cylinders of this type, pistons are provided which form a pressure space together with the inner wall of the brake cylinder. The gap between the piston and the inner wall of the brake cylinder has to be sealed via a sealing ring, with the result that a corresponding pneumatic pressure can be built up in the pressure space. The sealing ring is usually configured as a separate part and is connected to the piston by a press fit or else is screwed. If the sealing ring is connected to the piston via a press fit, a steel ring is vulcanized into the sealing ring. In order for it to be possible to ensure the press fit, the piston also has to be machined specially at the location of the press fit before the sealing ring is attached. The costs for this piston and for the mounting of the piston are comparatively high.

In the case of reconditioning of the brake cylinder, the sealing ring can be exchanged separately. An exchange of this type of the sealing ring has to take place during reconditioning, since the sealing ring is subjected to wear. Likewise, embrittlement of the sealing ring occurs as a result of ageing. During this reconditioning, the piston is dismantled together with a piston tube which is normally connected fixedly to the piston via a screw connection or weld, and the old sealing ring is removed. A new sealing ring is then mounted and the piston with piston tube is installed into the brake cylinder again. The mounting outlay during the reconditioning of a brake cylinder is therefore relatively high.

SUMMARY

Disclosed embodiments are based on the concept of designing a pneumatic brake cylinder in such a way that both the production costs and the mounting costs can be reduced. This may be achieved by a pneumatic brake cylinder designed in accordance with the claimed invention.

BRIEF DESCRIPTION OF THE FIGURES

Further details and advantages of the disclosed embodiments result from the description of one exemplary embodiment which will be explained in detail using the drawing, in which.

DETAILED DESCRIPTION

Figure 1:
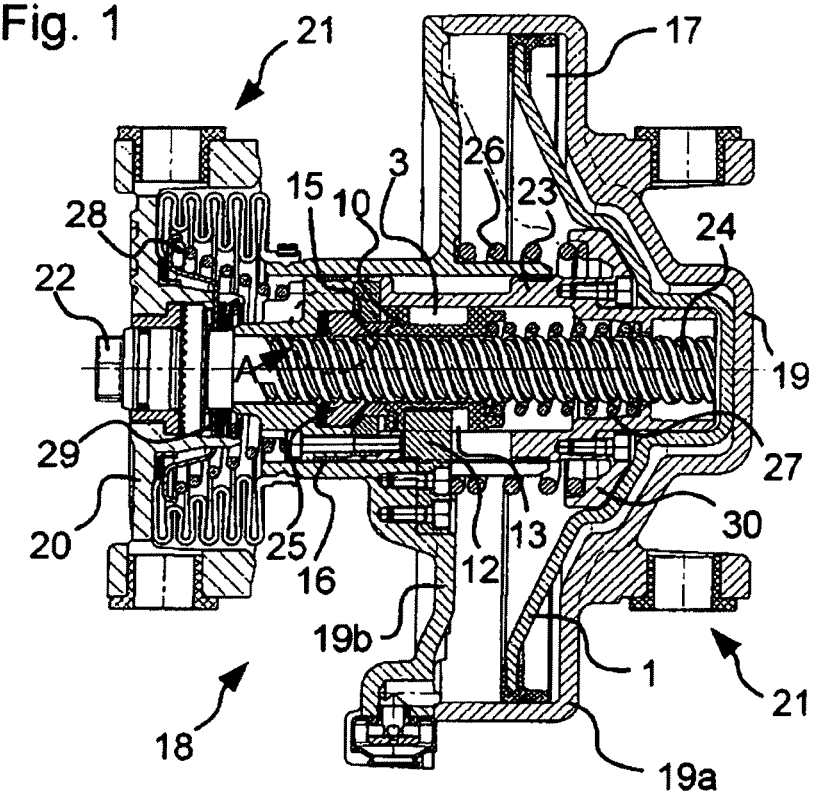
FIG. 1 shows a section through a pneumatic brake cylinder according to disclosed embodiments.

As a result of the fact that the sealing ring is vulcanized onto the piston, no dismantling of the old sealing ring and no mounting of a new sealing ring have to take place. The complete piston can be exchanged in a simple manner. Since the steel ring for the press fit has already had to be vulcanized into the sealing ring in the previously customary sealing ring, no additional vulcanizing operation is required in the case of the novel piston. In particular, however, the mounting is simplified considerably during the production of the brake cylinder and also during the reconditioning of the brake cylinder, as a result of which the mounting costs can be reduced.

The piston is advantageously produced as a deep drawn part. Steel is used as material for the piston. The production costs of the novel piston lie only fractionally above the production costs for the old sealing ring with the steel ring vulcanized into it. The reduced mounting costs are also reflected almost completely in the case of reconditioning of the brake cylinder. In the production of the brake cylinder, the reduced mounting costs are also accompanied by the costs of the novel piston with a sealing ring which is vulcanized on which are reduced in comparison with the old piston with a sealing ring which is pressed on.

Particularly advantageously, the piston is inserted loosely into the brake cylinder. This measure also once again allows mounting costs to be saved considerably, both during the production of the brake cylinder and during the reconditioning of the brake cylinder.

A piston tube is advantageously mounted displaceably in the brake cylinder, the piston tube having a bearing face which corresponds with a bearing face of the piston. In this way, the piston is given a large area contact with the piston tube, with the result that a screw connection or weld can be dispensed with.

In the previously usual brake cylinders, the torque which was transmitted from an adjusting device to the piston tube was transmitted to the piston, for example via a fixed connection between the piston tube and the piston. The torque was introduced into the housing via guide pins which are attached to the piston and correspond with appropriate cutouts in the housing.

In the brake cylinder according to disclosed embodiments, in contrast, the piston tube is prevented from rotating with respect to the brake cylinder via sliding blocks. The sliding blocks are advantageously fastened to the housing of the brake cylinder and pass through slots which are provided in the piston tube. In this way, the piston tube can be displaced in the direction of its longitudinal axis, but initiates a torque which is transmitted to the piston tube into the housing of the brake cylinder via the sliding blocks. A rigid connection between the piston tube and the piston, such as a screw connection or weld, can also be dispensed with for this reason.

The sealing ring advantageously encloses the piston edge on three sides. As a result, a secure connection is ensured between the piston edge and the sealing ring. The strength of this connection could also be increased if the piston edge has been shaped correspondingly by stamping or bending. In this way, for example, a larger and irregularly shaped contact face could be achieved between the piston edge and the sealing ring. The intimacy of the connection would be increased as a result.

The sealing ring has a sealing lip which is arranged parallel to the inner side wall of the brake cylinder. The sealing lip, of the sealing ring which is composed of an elastomer, is responsible, in particular, for sealing the gap between the piston and the inner wall of the brake cylinder and therefore for sealing the pressure space. Since the sealing lip is not assisted directly by the rigid piston edge, it bears particularly satisfactorily against the inner wall of the brake cylinder and can thus compensate for diameter tolerances of the inner wall of the brake cylinder.

It should be noted, that the disclosed embodiments may have been described above and below with respect to different subject-matter. In particular, some embodiments may be described with reference to apparatus components, whereas those or other embodiments have been described with reference to methodologies. However, a person skilled in the art will gather from the above and the following description that, unless notified otherwise, in addition to any combination features belonging to one type of subject-matter also any combination between features relating to different subject-matter, in particular between features of apparatuses and features of methodologies, is considered to be disclosed with this application.

Figure 4:
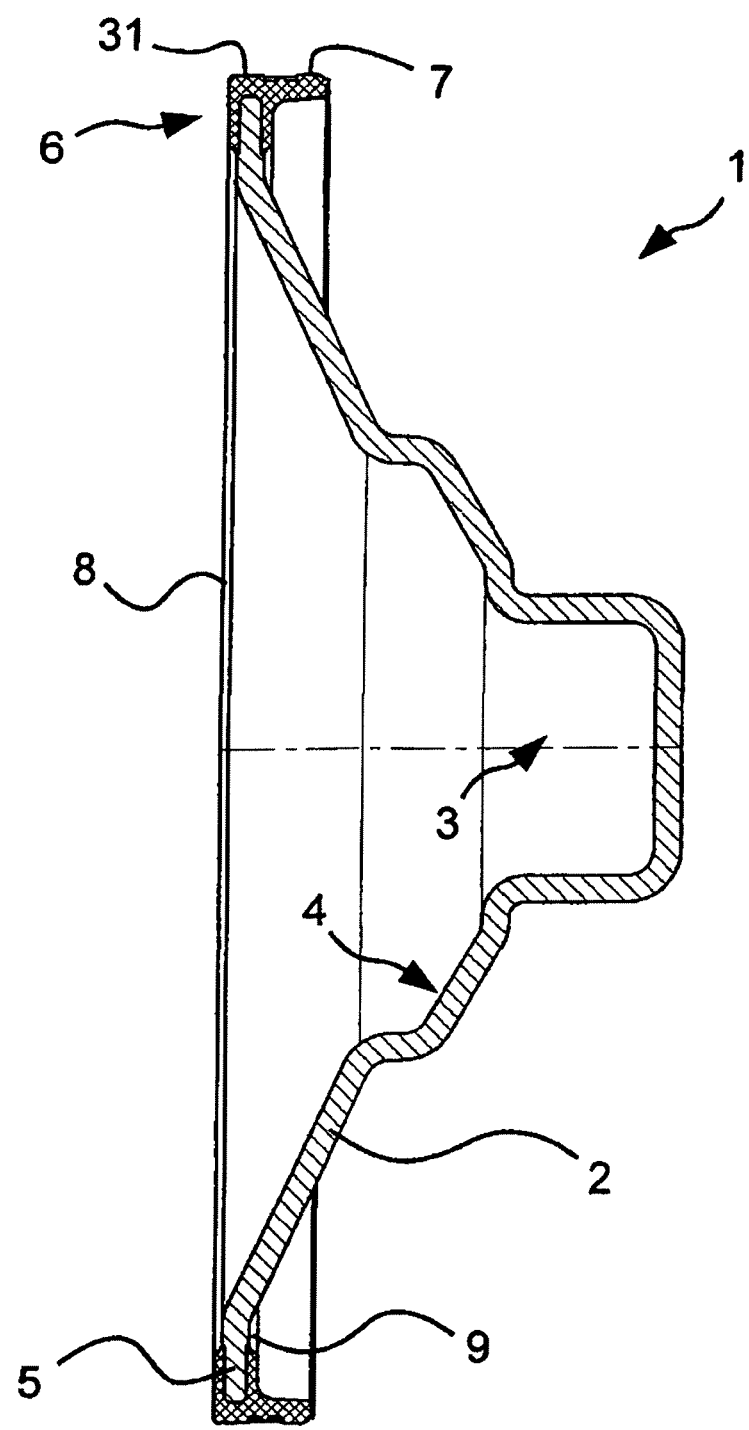
FIG. 4 shows a section through the piston from the brake cylinder according to FIG. 1.

The novel piston 1 which is shown in FIG. 4 is configured as a deep drawn part 2 and is produced from sheet steel. The piston tube receptacle 3 is provided in the center of the piston 1, with which piston tube receptacle 3 the piston 1 is pushed over the piston tube 23 which is shown in FIG. 1. A direct connection between the piston tube receptacle 3 and the piston tube 23 is not provided. Rather, the piston 1 acts on the piston tube 23 via the annular, conically configured bearing face 4 of the piston 1, via which bearing face 4 the piston 1 is also centered as soon as it is loaded with pressure. In another exemplary embodiment (not shown here), however, the piston can also be received by the housing of the brake cylinder and can be guided by the housing.

The sealing ring 6 is vulcanized onto the piston edge 5. The sealing ring is of L-shaped configuration, one limb surrounding the piston edge 5 in a groove-shaped manner. The groove which is formed in the limb is delimited by the lower lip 8 and the upper lip 9. The lower lip 8 and the upper lip 9 are pulled over the piston edge 5 to such an extent that an intimate connection is produced between the deep drawn part 2 and the sealing ring 6. The connection between the lower lip 8 and the upper lip 9 is formed by the guide face 31 which ensures reliable guidance of the piston 1 in the brake cylinder. The radially prestressed sealing lip 7 which projects from the upper lip 9 approximately at a 90° angle forms the actual seal for the pressure space 17 (see FIG. 1). The sealing ring 6 is formed from an elastomer which adapts itself satisfactorily to the inner wall of the housing 19 of the brake cylinder 18.

The use of the novel piston 1 will be explained using the pneumatic brake cylinder which is shown in FIG. 1. The fastenings 21 for a brake caliper are situated firstly on the yoke 20 and secondly on the housing 19 which is assembled from a cylinder 19a and a cover 19b. In order to actuate the brake, the brake caliper (not shown here) has to be pressed apart; this means that the spacing between the yoke 20 and the housing 19 has to be increased.

The piston 1 is provided in the housing 19. The pressure space 17 is formed by the piston 1 and the cylinder 19a of the housing 19. The compressed air connection, via which compressed air is fed to the pressure space 17, cannot be seen in this illustration. The piston tube 23 is actuated by the piston 1. However, the piston 1 is not connected fixedly to the piston tube 23, but rather is inserted loosely into the brake cylinder. The actuation of the piston tube 23 takes place merely via the annular bearing face 4 of conical configuration, with which the piston 1 presses onto a spring collar 30 which is screwed to the piston tube 23.

Slots are provided in the piston tube 23, through which slots sliding blocks 12 extend which are screwed to the housing 19. This measure prevents rotation of the piston tube 23 with respect to the housing 19, but in contrast permits a longitudinal displacement of the piston tube 23. In the case of the longitudinal displacement, the piston tube 23 is supported by the annular sliding bands 16 on the inner wall of the housing 19. The piston 1 and the piston tube 23 are held in their rest position by the piston return spring 26 which is supported on the cover 19a of the housing 19 and the spring collar 30 of the piston tube 23.

The spindle 24 is situated in the piston tube 23. The position of the spindle 24 is controlled by the adjusting nut 25. The adjusting nut 25 and spindle 24 are connected to one another via a thread which is not self-locking, with the result that a force in the direction of the longitudinal axis of the spindle 24 exerts a torque on the adjusting nut 25. This force is exerted on the spindle 24 by the conical spring 28 which is supported on the yoke 20 and the piston tube 23. The conical spring 28 therefore exerts a force which attempts to pull the spindle 24 out of the piston tube 23.

A control sleeve 10 is provided in the piston tube 23. The control sleeve 10 is constructed as a composite part, a coupling ring having been connected to a sliding sleeve. The coupling ring is configured as an extruded steel part. The free end side of the toothed ring 9 is provided with an oblique internal toothing system 11. Two sliding channels which lie opposite one another are machined into the sliding sleeve. The sliding blocks 12 engage into the sliding channels. The width of the sliding blocks 12 is adapted exactly to the width of the sliding channels, with the result that no rotational movement of the control sleeve 10 is possible if the sliding blocks 12 are fixed. In order for it to be possible to fix the sliding blocks 12, fastening holes are provided which serve to receive screws. The longitudinal extent of the sliding channels is dimensioned in such a way that the setting stroke 13 remains during engagement of the sliding blocks 12. The significance of the setting stroke 13 will be explained in greater detail further below during the functional description of the brake cylinder.

Figure 2:
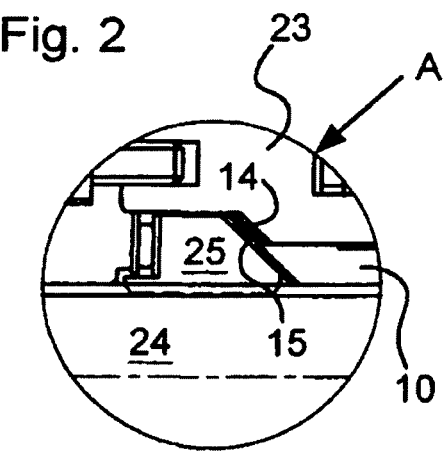
FIGS. 2 and 3 show detail illustrations of the brake cylinder which is shown in FIG. 1, in different operating states.
Figure 3:
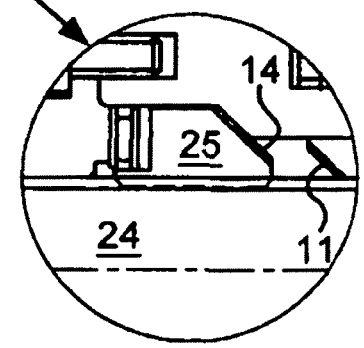

On its oblique end side, the adjusting nut 25 has an external toothing system 14 (see, in particular, FIGS. 2 and 3 which illustrate the part denoted by A in FIG. 1 on an enlarged scale and in different working states). The internal toothing system 11 of the control sleeve 10 is in engagement with the external toothing system 14 of the adjusting nut 25 in the release position of the brake. The control sleeve 10 is prevented from rotating via the sliding blocks 12 which are screwed to the housing 19. As a result of the engagement of the internal toothing system 11 of the control sleeve 10 with the external toothing system 14 of the adjusting nut 25, the latter is likewise prevented from rotating. The control sleeve 10 is prestressed via the locking spring 27 which is supported on the control sleeve 10 and on the piston tube 23. A toothed ring which is connected to the spindle 24 is pressed into a toothing system of the yoke 20 with the aid of the disk spring 29, with the result that rotation of the spindle 24 with respect to the yoke 20 is prevented.

In the following text, the function of the brake cylinder 18 is to be described:

The piston 1 is pressed to the left by an increase of the pneumatic pressure in the pressure space 17. Here, it actuates the piston tube 23 and likewise presses it to the left, counter to the force of the piston return spring 26. The control sleeve 10 which is prestressed by the locking spring 27 is pressed with its internal toothing system 11 onto the external toothing system 14 of the adjusting nut 25 and likewise moves to the left together with the piston tube 23, spindle 24, adjusting nut 25 and yoke 20. In contrast, the piston tube toothing system 15 is not in engagement with the external toothing system of the adjusting nut 25. This state is shown in FIG. 2.

At the moment, at which the control sleeve 10 has been displaced so far to the left that the setting stroke 13 between the sliding blocks 12 and the boundary of the sliding channels closes, the brake linings (not shown here) come into contact with the brake disk. From this point in time, a counterpressure is built up via the yoke 20. Since the setting stroke 13 has now closed, the control sleeve 10 can no longer participate in a further movement of the piston tube 23.

The piston tube 23 is then displaced further to the left by a small amount, counter to the force of the conical spring 28, while the yoke 20, spindle 24 and adjusting nut 25 remain at the same location. As a result of this displacement of the piston tube 23 with respect to the adjusting nut 25, the external toothing system 14 of the adjusting nut 25 comes out of engagement with the internal toothing system 11 of the control sleeve 10. At the same time, however, the external toothing system 14 comes into engagement with the piston tube toothing system 15.

In the case of a further build up of pressure in the pressure space 17, the brake linings are pressed against the brake disk, the piston tube 23 being pressed with great force against the adjusting nut 25. As a result of these forces which are directed counter to one another of the piston 1 and piston tube 23 on one side and of the yoke 20, spindle 24 and adjusting nut 25 on the other side, a torque is exerted on the adjusting nut 25. This torque is absorbed by the piston tube toothing system 15 and transmitted to the piston tube 23. The torque passes to the housing 19 via the sliding blocks 12. The housing 19 is connected to the brake caliper via the fastenings 21 in such a way that the torque is finally absorbed here. This state of the piston tube 23, adjusting nut 25 and control sleeve 3 is shown in FIG. 3.

When the brake is released, the piston tube toothing system 15 is also released again from the external toothing system 14 of the adjusting nut 25. At the same time, the external toothing system 14 of the adjusting nut 25 comes into engagement again with the internal toothing system 11 of the control sleeve 10.

Whereas no rotation of the adjusting nut 25 is permitted during a normal braking operation, the adjusting nut 25 has to be able to rotate when an adjustment becomes necessary on account of wear of the brake linings and/or brake disk. If a certain amount of wear of the brake linings has taken place, the gap between the brake linings and the brake disk has also increased. As a result, a greater piston stroke is necessary, in order to bring the brake linings into contact with the brake disk again.

The braking process is initiated as in the case of a normal braking operation. The piston 1, piston tube 23 and control sleeve 10 move together to the left. The control sleeve 10 participates in this movement until the setting stroke 13 is closed. The internal toothing system 11 of the control sleeve 10 is then decoupled from the external toothing system 14 of the adjusting nut 25. In contrast with a normal braking process, however, no counterpressure is then built up, since the brake linings are not yet in contact with the brake disk. As a result, the piston tube toothing system 15 does not yet couple into the external toothing system 14 of the adjusting nut 25. A force is exerted via the conical spring 28 on the yoke 20 and spindle 24, which force attempts to pull the spindle 24 to the left out of the piston tube 23. Here, a torque acts on the adjusting nut 25. Since, in this state, the external toothing system 14 of the adjusting nut 25 is coupled neither to the internal toothing system 11 of the control sleeve 10 nor to the piston tube toothing system 15, the adjusting nut 25 can yield to the torque and rotates on the spindle 24. As a result of this rotation of the adjusting nut 25, the spindle 24 can be pulled out to the left relative to the adjusting nut 25.

The rotation of the adjusting nut 25 continues until the brake linings have come into contact with the brake disk. At this moment, a counterpressure is built up again which brings about coupling of the piston tube toothing system 15 to the external toothing system 14 of the adjusting nut 25. The adjusting operation is therefore finished and further braking processes take place again without adjustment until a certain amount of wear of the brake linings has occurred once again.

If an adjustment is no longer possible, the brake linings have to be changed. Here, the brake cylinder 18 also has to be reset into its original state again. To this end, force is applied to the return hexagon 22 and the spindle 24 is turned completely into the piston tube 23 again. During the first braking process, after the mounting of the new brake linings, an adjustment takes place again, with the result that here too the predefined spacing between the brake linings and the brake disk is automatically set correctly.

Since the sealing ring 6 is subjected to wear and ageing and can no longer ensure a sufficient seal of the gap between the piston 1 and the inner wall of the cylinder 19a of the housing 19 after a certain time period, the sealing ring has to be replaced during reconditioning of the brake cylinder. If the brake cylinder according to disclosed embodiments is used, the complete piston 1 is exchanged for this purpose. Only a few mounting steps are necessary for this, since the piston 1 is inserted only loosely into the brake cylinder 18 and is not connected fixedly to the piston tube 23. The novel piston 1 is an inexpensive deep drawn part, with the result that no high material costs are produced either by the exchange of the entire piston.

LIST OF DESIGNATIONS

1 Piston
2 Deep drawn part
3 Piston tube receptacle
4 Bearing face of the piston
5 Piston edge
6 Sealing ring
7 Sealing lip
8 Lower lip
9 Upper lip
10 Control sleeve
11 Internal toothing system
12 Sliding block
13 Setting stroke
14 External toothing system of the adjusting nut
15 Piston tube toothing system
16 Sliding band
17 Pressure space
18 Brake cylinder
19 Housing
19a Cylinder
19b Cover
20 Yoke
21 Fastening for brake caliper
22 Return hexagon
23 Piston tube
24 Spindle 25 Adjusting nut
26 Piston return spring
27 Locking spring
28 Conical spring
29 Disk spring
30 Spring collar
31 Guide face

The invention claimed is:

1. A pneumatic brake cylinder comprising:
a piston configured to transmit pneumatic pressure to a brake, the piston having a pressure space which is delimited by the piston and a part of an inner wall of a brake cylinder and having a sealing ring which seals a gap between the piston and the inner wall of the brake cylinder, wherein the sealing ring is vulcanized onto the piston,
wherein the piston is manufactured as a deep drawn part manufactured from steel,
wherein the piston is inserted loosely into the brake cylinder,
wherein the brake cylinder further comprises a piston tube mounted displaceably in the brake cylinder, the piston tube having a bearing face which corresponds with a bearing face of the piston, and wherein the piston tube is prevented from rotating with respect to the brake cylinder by sliding blocks.

2. The pneumatic brake cylinder of claim 1, wherein the sliding blocks are fastened to the housing and pass through slots of the piston tube.

3. The pneumatic brake cylinder of claim 1, wherein the sealing ring encloses the piston edge on three sides.

4. The pneumatic brake cylinder of claim 3, wherein the sealing ring has a sealing lip which is arranged substantially parallel to the inner side wall of the brake cylinder.

5. A method for reconditioning a brake cylinder of claim 1, wherein the complete piston with sealing ring is exchanged.

* * * * *